United States Patent
Jul et al.

(10) Patent No.: US 9,894,530 B2
(45) Date of Patent: Feb. 13, 2018

(54) NETWORK NODES AND METHODS

(75) Inventors: Eric B. Jul, Roskilde (DK); Holger Claussen, Straffan (IE)

(73) Assignee: Alcatel Lucent, Boulogne-Billancourt (FR)

( * ) Notice: Subject to any disclaimer, the term of this patent is extended or adjusted under 35 U.S.C. 154(b) by 256 days.

(21) Appl. No.: 13/883,659

(22) PCT Filed: Nov. 2, 2011

(86) PCT No.: PCT/EP2011/005507
§ 371 (c)(1),
(2), (4) Date: Jul. 22, 2013

(87) PCT Pub. No.: WO2012/059214
PCT Pub. Date: May 10, 2012

(65) Prior Publication Data
US 2013/0294364 A1 Nov. 7, 2013

(30) Foreign Application Priority Data
Nov. 5, 2010 (EP) ..................... 10360041

(51) Int. Cl.
*H04W 16/14* (2009.01)
*H04J 13/20* (2011.01)
(Continued)

(52) U.S. Cl.
CPC ............. *H04W 16/14* (2013.01); *H04J 13/20* (2013.01); *H04W 72/0406* (2013.01);
(Continued)

(58) Field of Classification Search
CPC ............ H04J 13/20; H04J 13/18; H04J 13/16; H04W 72/0466; H04W 52/40
See application file for complete search history.

(56) References Cited

U.S. PATENT DOCUMENTS 6,233,231 B1 5/2001 Felix et al.
6,597,677 B1 7/2003 Segawa
(Continued)

FOREIGN PATENT DOCUMENTS

CN 1384628 A 12/2002
CN 1528100 A 9/2004
(Continued)

OTHER PUBLICATIONS

Draft EN 301 349, V6.1.0, European Standard (Telecommunication series), Digital cellular telecommunications system (Phase 2+); General Packet Radio Service (GPRS); Mobile Station (MS)—Base Station System (BSS) interface; Radio Link Control / Medium Access Control (RLC/MAC) protocol (GSM 04.60 version 6.1.0 Release 1997), Aug. 1998, 152 pages.
(Continued)

*Primary Examiner* — David Oveissi
*Assistant Examiner* — Thomas D Busch
(74) *Attorney, Agent, or Firm* — Fay Sharpe, LLP

(57) ABSTRACT

Methods and network nodes of a wireless telecommunications system are disclosed. One method of controlling transmissions with a base station of a wireless telecommunications system comprises the steps of: determining a set of neighboring base stations, each base station in the set of neighboring base stations utilizing an identical carrier and scrambling code to support transmissions with that base station; and allocating base stations in the set of neighboring base stations different spreading codes for transmissions with those base stations. By allocating each base station in the set of base stations sharing the same carrier and scrambling code different spreading codes, interference in transmissions between the base stations can be controlled.

21 Claims, 6 Drawing Sheets

(51) Int. Cl.
*H04W 72/04* (2009.01)
*H04W 8/00* (2009.01)
*H04W 72/08* (2009.01)
*H04W 88/08* (2009.01)

(52) U.S. Cl.
CPC ........ *H04W 72/0466* (2013.01); *H04W 8/005* (2013.01); *H04W 72/082* (2013.01); *H04W 88/08* (2013.01)

(56) References Cited

U.S. PATENT DOCUMENTS

| | | | |
|---|---|---|---|
| 6,628,633 B1 | 9/2003 | Mochizuki | |
| 6,845,087 B1* | 1/2005 | Holdrege | H04B 7/2618 370/335 |
| 7,693,106 B1 | 4/2010 | Ishikawa et al. | |
| 2002/0114289 A1* | 8/2002 | Ishikawa | H04J 13/16 370/320 |
| 2002/0122402 A1 | 9/2002 | Periyalwar et al. | |
| 2002/0122403 A1 | 9/2002 | Hashem et al. | |
| 2003/0054761 A1* | 3/2003 | Karabinis | H04B 7/18543 455/12.1 |
| 2004/0264557 A1* | 12/2004 | Maruyama | H04B 1/7107 375/148 |
| 2005/0117548 A1* | 6/2005 | Cam | H04J 13/0044 370/335 |
| 2006/0227908 A1 | 10/2006 | Scharf et al. | |
| 2007/0041404 A1* | 2/2007 | Palanki | H04B 1/692 370/479 |
| 2007/0268959 A1* | 11/2007 | Bi | H04J 13/20 375/146 |
| 2008/0298439 A1* | 12/2008 | Courseille | H04B 7/2041 375/146 |
| 2010/0074306 A1* | 3/2010 | Raza | H04J 13/00 375/140 |
| 2011/0269451 A1* | 11/2011 | Liu et al. | 455/422.1 |

FOREIGN PATENT DOCUMENTS

| | | |
|---|---|---|
| CN | 101 052 205 A | 10/2007 |
| CN | 101540632 A | 9/2009 |
| GB | 2 446 192 A | 8/2008 |
| JP | 11-308671 A | 11/1999 |
| JP | 2000-32531 A | 1/2000 |
| JP | 2001-54158 A | 2/2001 |
| JP | 2001-333458 A | 11/2001 |
| JP | 2003-517752 A | 5/2003 |
| JP | 2006-340051 A | 12/2006 |
| WO | 2001/18987 A1 | 3/2001 |
| WO | 2006/101168 A1 | 9/2006 |
| WO | WO 2008/088592 A1 | 7/2008 |
| WO | WO 2008088592 A1 * | 7/2008 ............ H04W 36/04 |
| WO | WO 2009/120939 A1 | 10/2009 |

OTHER PUBLICATIONS

English Bibliography for Japanese Patent Application Publication No. JP11308671A, published Nov. 5, 1999, printed from Thomson Innovation on Jun. 4, 2014, 4 pages.
English Bibliography for Japanese Patent Application Publication No. JP2000032531A, published Jan. 28, 2000, printed from Thomson Innovation on Jun. 4, 2014, 4 pp.
English Bibliography for Japanese Patent Application Publication No. JP2001054158A, published Feb. 23, 2001, printed from Thomson Innovation on Jun. 4, 2014, 5 pp.
English Bibliography for Japanese Patent Application Publication No. JP2001333458A, published Nov. 30, 2001, printed from Thomson Innovation on Jun. 4, 2014, 3 pp.
English Bibliography for Japanese Patent Application Publication No. JP2003517752A, published May 27, 2003, printed from Thomson Innovation on Jun. 4, 2014, 3 pp.
English Bibliography for Japanese Patent Application Publication No. JP2006340051A, published Dec. 14, 2006, printed from Thomson Innovation on Jun. 4, 2014, 3 pp.
English Bibliography for PCT Patent Publication No. WO2006101168A1, published Sep. 28, 2006, printed from Thomson Innovation on Jun. 4, 2014, 3 pp.
Sawahashi et al., W-CDMA Wireless Access System (for Your Information (18)), Journal of Institute of Image Information and Television Engineers, Dec. 20, 2000, pp. 61-62.
English Bibliography for Chinese Patent Application Publication No. CN1384628A, published Dec. 11, 2002, printed from Thomson Innovation on May 16, 2016, 3 pp.
English Bibliography for Chinese Patent Application Publication No. CN1528100A, published Sep. 8, 2004 printed from Thomson Innovation on May 16, 2016, 5 pp.
English Bibliography for Chinese Patent Application Publication No. CN101540632A, published Sep. 23, 2009, printed from Thomson Innovation on May 16, 2016, 4 pp.
Database WPI Week 200830, Thomson Scientific, London, GB; AN 2008-E27302, XP002634799, 1 page May 13, 2011.& CN 101 052 205 A (Zhongxing Communication Co. Ltd. Shenzhen), 1 page, abstract, Oct. 10, 2007.
International Search Report for PCT/EP2011/005507 dated Jun. 20, 2012.

* cited by examiner

NETWORK NODES AND METHODS

FIELD OF THE INVENTION

The present invention relates to methods and network nodes of a wireless telecommunications system.

BACKGROUND

In a cellular wireless telecommunications system, radio coverage is provided by areas known as cells. A base station is located in each cell to provide the radio coverage area. Traditional base stations provide coverage in relatively large geographical areas and these cells are often referred to as macro cells. It is possible to provide smaller-sized cells, often within a macro cell. Such smaller-sized cells are sometimes referred to as micro cells, pico cells or femto cells. The term femto cells will be used to refer generally to all such small cells. Small cells are typically established by providing a small-cell base station that provides radio coverage having a relatively limited range within the radio coverage area of a macro cell. The transmission power of the small-cell base station is relatively low and, hence, each small cell provides a smaller coverage area compared to that of a macro cell and covers, for example, an office or a home. A group of such small-cell base stations may together provide a wireless small-cell network.

Such small cells are typically provided where the communications coverage provided by the macro cell is poor or where a user wishes to use an alternative communications link provided locally, by the small-cell base station, to communicate with the core network. Such a situation may arise where, for example, a user has a pre-existing communications network and the user wishes to utilise that link in preference to that provided by the macro network to communicate with the core network. The group of small-cell base stations providing the wireless small-cell network can together provide extended local coverage to user equipment throughout, for example, a home or an office building by using multiple small-cell base stations distributed throughout those buildings which enables each of those base stations to transmit at a lower power than would otherwise be necessary if coverage was provided by a single small-cell base station.

However, the proliferation of the deployment of such small-cell base stations, as well as any increasing density in macro base stations, can cause undesirable consequences. Accordingly, it is desired to provide improved techniques for obviating the problems associated with such deployment.

SUMMARY

According to a first aspect, there is provided a method of controlling transmissions with a base station of a wireless telecommunications system, the method comprising the steps of: determining a set of neighbouring base stations, each base station in the set of neighbouring base stations utilising an identical carrier and scrambling code to support transmissions with that base station; and allocating base stations in the set of neighbouring base stations different spreading codes for transmissions with those base stations.

The first aspect recognises that the number of separate carrier frequencies available for use by a wireless telecommunications network operator is limited and that carriers may need to be reused. This is particularly the case when base stations are deployed in close proximity and it is not possible to allocate each a separate carrier on a separate frequency and so as the density of deployment increases, the likelihood of interference occurring between base stations occurring increases. This is likely to particularly be the case for small-cell base stations which are deployed by private users sometimes in dense areas such as apartment complexes or commercial buildings. In such circumstances, transmissions by one base station may interfere with transmissions by another.

Whilst it may be possible to mitigate against interference by adjusting power levels of transmissions from the base stations, this can dramatically reduce the coverage area of the base stations. Also, whilst it may be possible to separate base stations on the same carrier by using different scrambling codes, as the density of deployment increases the likelihood of neighbouring base stations using the same scrambling code also increases.

The first aspect recognises that having base stations in close proximity to each using the same carrier and scrambling code will lead to transmissions by one base station interfering with transmissions by another.

Accordingly, a set or group of neighbouring base stations is determined. That set of base stations may comprise base stations that neighbour each other (i.e. they have overlapping or adjacent coverage areas) and that use the same carrier frequency and scrambling code. Hence, these base stations provide overlapping or adjacent cells operating with an identical carrier frequency and scrambling code to support transmissions with each of the base stations in the set. Neighbouring base stations utilising the same carrier and scrambling code will likely cause interference with each other. Accordingly, each base station in that set of neighbouring base stations is then allocated a spreading code that differs to those used by other base stations in the set for transmissions within their cell. Although each base station could select its own spreading code in isolation, there is a risk that a greater level of interference may still occur than is otherwise possible by controlling the allocation of the spreading codes between all base stations in the set. However, by allocating each base station in the set of base stations sharing the same carrier and scrambling code different spreading codes, interference in transmissions between the base stations can be controlled.

In one embodiment, the step of allocating comprises: allocating different spreading codes based on operating characteristics of base stations in the set of neighbouring base stations. The spreading codes allocated will affect the throughput available to each base station. Accordingly, it is possible to allocate each spreading code in a way that seeks to accommodate any operational demands that may be known for each base station. For example, should the operating characteristics of one base station indicate that it has a higher demand than others, then it may be possible to allocate a spreading code that favours that base station over others within the set. Equally, if each base station has similar demands, then it would be possible to allocate spreading codes that meet those demands equally.

In one embodiment, the step of allocating comprises: allocating spreading codes based on a traffic demand of base stations within the set of neighbouring base stations. Accordingly, spreading codes may be allocated based on the relative traffic demands of each base station. For example, it may be possible to provide a spreading code that provides increased throughput to a higher traffic demand base station and a spreading code that provides reduced throughput to a lower traffic demand base station. Accordingly, in embodiments, the step of allocating comprises allocating a group of spreading codes that optimise achievement of the traffic demand. It will be appreciated that the allocation of such spreading codes may require a compromise solution, should it not be possible to meet all the demands of every base station within the set. Accordingly, there is a trade-off between the number of useable spreading codes and the maximum data rate achievable on the channels. Thus, base stations that require high data rates need short codes, but there are a limited number of short codes. To support many base stations, there needs to be many codes in use, one for each channel. Accordingly, careful negotiation of spreading codes is required to ensure that there are enough codes for each base station to operate and that the channels requiring high data rates get as short a code as possible. It will be appreciated that spreading codes can be reused by other base stations belonging to other sets of neighbouring base stations, providing the two base stations that use the same spreading code are not within range of each other.

In one embodiment, the step of allocating comprises: allocating spreading codes based on a minimum expected traffic demand of base stations within the set of neighbouring base stations. Accordingly, even when no traffic demand is indicated by base stations within the set, the spreading codes may still be allocated to provide for a minimum traffic demand from that base station, in the expectation that the base station may have such a traffic demand in the future. By pre-allocating spreading codes to the base station to support an expected traffic demand, should such demand subsequently arise then the base station is immediately in a position to provide that level of support to user equipment without needing to negotiate the allocation of a spreading code. This improves the stability of the system and reduces signalling demands. In one embodiment, the step of allocating comprises allocating a group of spreading codes that optimise achievement of the minimum expected traffic demand.

In one embodiment, the step of allocating comprises: restricting allocation of spreading codes based on a minimum quality of service required for transmissions with base stations within the set of neighbouring base stations. Accordingly, the need to achieve a minimum quality of service may restrict the allocation of possible spreading codes. For example, quality of service requirements may demand that transmissions should be configured to ensure that the need to guarantee that data transmissions are received is prioritised over data bandwidth. That is to say, it may be required that it can be ensured that particular data transmissions can always be received, even if the data rate of those data transmissions has to be reduced. Hence, the allocation of those spreading codes that may increase data rate at the risk of leading to loss of data can be avoided, thereby restricting the allocation of those spreading codes. In one embodiment, the step of allocating comprises allocating a group of spreading codes that optimise achievement of the minimum quality of service.

In one embodiment, the step of allocating comprises: allocating spreading codes based on a size of the set of neighbouring base stations. Accordingly, the spreading codes may be allocated based on the size of the set of neighbouring base stations. In this way, the ability to allocate a spreading code to each base station within the set can be improved. In one embodiment, the step of allocating comprises allocating a different spreading code to each base station in the set. It will be appreciated that this should be contrasted with arrangements where each base station determines its own spreading code in isolation which may prevent these base stations from transmitting with minimal interference. In one embodiment, the step of allocating comprises allocating spreading codes for at least the number of base stations in the set.

In one embodiment, the step of allocating comprises: allocating spreading codes based on a spreading code reservation requirement for expected future spreading code allocation. Accordingly, the spreading code allocation may be made in a way that reserves spreading codes for future use. In this way, not every possible spreading code that maximises data throughput may be allocated and instead some spreading codes may be reserved to enable those spreading codes to be allocated should they be required. This enables the rapid allocation of those reserved spreading codes when they are needed without necessarily needing to change any of the spreading codes that have already been allocated. Once again, this improves the stability of the system and reduces the amount of signalling required in response to network changes.

In one embodiment, the predetermined selection criteria reselects spreading codes based on a change in the characteristics. Accordingly, should a change in operating characteristics of the base stations occur, then a determination may be made of whether any changes to the allocated spreading codes are required. Only when a change in the allocation of spreading codes is required are the spreading codes reselected. Once again, this improves the stability of the system and reduces the amount of signalling required in response to network changes.

In one embodiment, wherein the spreading codes are orthogonal spreading codes. Accordingly, the spreading codes may be orthogonal with each other in order to reduce interference.

In one embodiment, wherein the orthogonal spreading codes comprise a hierarchical tree of spreading orthogonal codes, different levels of the hierarchical tree of spreading orthogonal codes providing orthogonal spreading codes of different lengths and each level of the hierarchical tree of spreading orthogonal codes providing a number of orthogonal spreading codes having identical lengths. Providing a hierarchical tree simplifies the allocation process, since the length of the spreading code increases by one every time a branch of the tree is followed in a direction away from the root. At the leaves of the tree the codes are longest and provide the lowest data rates. At the root of the tree the code is the shortest and provide the highest data rates. Orthogonality of the codes is achieved by ensuring that if a given code in the tree is used, none of the codes from that code in the direction of the leaves can then be used.

According to a second aspect there is provided A network node, comprising: determining logic operable to determine a set of neighbouring base stations of a wireless telecommunications system, each base station in the set of neighbouring base stations utilising an identical carrier and scrambling code to support transmissions with that base station; and allocation logic operable to allocate base stations in the set of neighbouring base stations different spreading codes for transmissions with those base stations.

In one embodiment, the network node comprises one of a base station and a base station controller. In one embodiment, the base station comprises a femto base station. In one embodiment, the base station controller comprises a femto gateway.

In one embodiment, the allocation logic is operable to allocate different spreading codes based on operating characteristics of base stations in the set of neighbouring base stations.

In one embodiment, the allocation logic is operable to allocate spreading codes based on a traffic demand of base stations within the set of neighbouring base stations.

In one embodiment, the allocation logic is operable to allocate spreading codes based on a minimum expected traffic demand of base stations within the set of neighbouring base stations.

In one embodiment, the allocation logic is operable to restrict allocation of spreading codes based on a minimum quality of service required for transmissions with base stations within the set of neighbouring base stations.

In one embodiment, the allocation logic is operable to allocate spreading codes based on a size of the set of neighbouring base stations.

In one embodiment, the allocation logic is operable to allocate spreading codes based on a spreading code reservation requirement for expected future spreading code allocation.

In one embodiment, the step of allocating comprises: reselecting spreading codes based on a change in the operating characteristics.

In one embodiment the spreading codes are orthogonal spreading codes.

In one embodiment, the orthogonal spreading codes comprise a hierarchical tree of spreading orthogonal codes, different levels of the hierarchical tree of spreading orthogonal codes providing orthogonal spreading codes of different lengths and each level of the hierarchical tree of spreading orthogonal codes providing a number of orthogonal spreading codes having identical lengths.

According to a third aspect, there is provided a computer program product operable, when executed on a computer, to perform the method steps of the first aspect.

Further particular and preferred aspects are set out in the accompanying independent and dependent claims. Features of the dependent claims may be combined with features of the independent claims as appropriate, and in combinations other than those explicitly set out in the claims.

BRIEF DESCRIPTION OF THE DRAWINGS

Embodiments of the present invention will now be described further, with reference to the accompanying drawings, in which.

DESCRIPTION OF THE EMBODIMENTS

Figure 1:
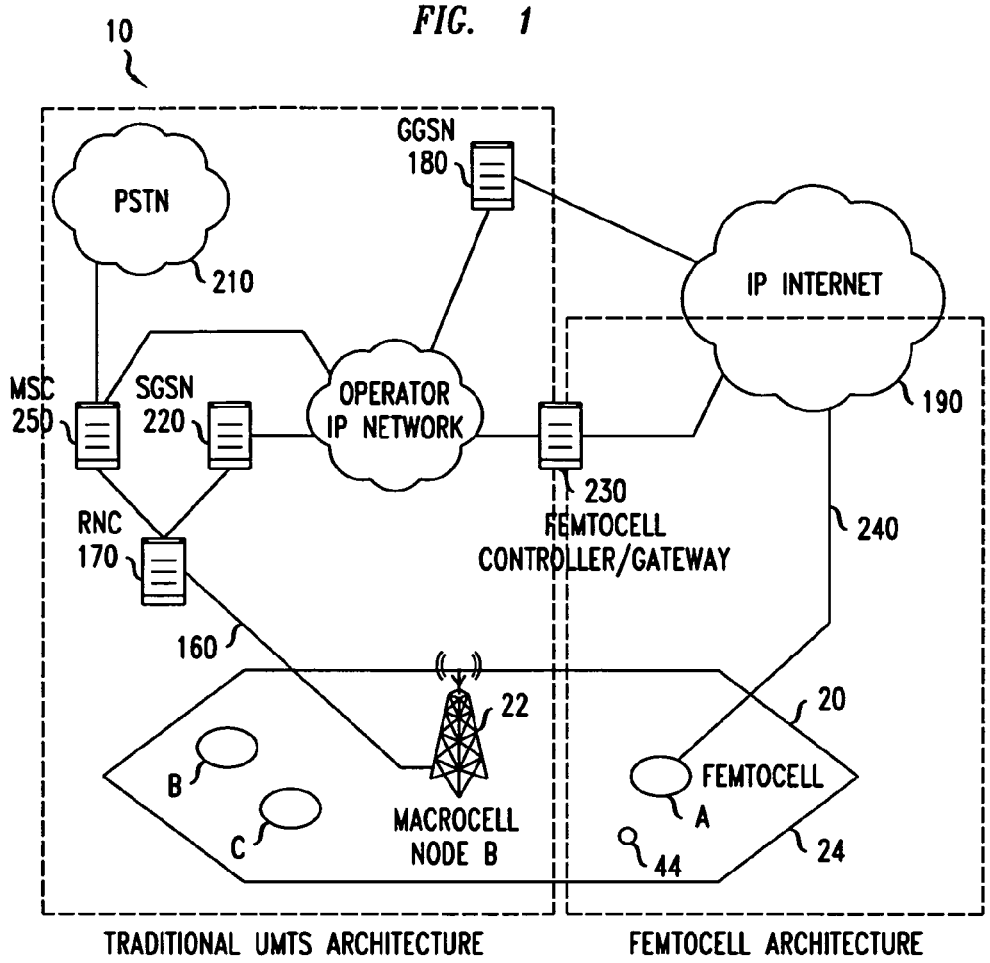
FIG. 1 illustrates the main components of a wireless telecommunications network according to one embodiment.

FIG. 1 illustrates a wireless communication system, generally 10, according to one embodiment. User equipment 44 roam through the wireless communication system 10. Base stations 22 are provided which support respective macro cells 24. A number of such base stations are provided, which are distributed geographically in order to provide a wide area of coverage to the user equipment 44. When user equipment 44 is within a macro cell 24 supported by the base station 22 then communications may be established between the user equipment 44 and the base station 22 over an associated radio link. Each base station typically supports a number of sectors. Typically, a different antenna within a base station supports an associated sector. Of course, it will be appreciated that FIG. 1 illustrates a small subset of the total number of user equipment and base stations that may be present in a typical communications system.

The wireless communication system 10 is managed by a radio network controller 170. The radio network controller 170 controls the operation of the wireless communications system 10 by communicating with the base stations 22 over a backhaul communications link 160. The network controller 170 also communicates with the user equipment 44 via their respective radio links in order to efficiently manage the wireless communication system 10.

Figure 2:
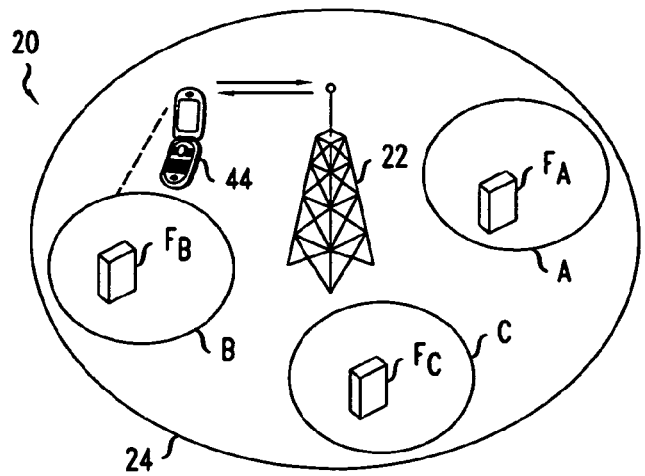
FIG. 2 illustrates a general femto cell deployment within one macro cell shown in FIG. 1.

The radio network controller 170 maintains a neighbour list which includes information about the geographical relationship between cells supported by base stations. In addition, the radio network controller 170 maintains location information which provides information on the location of the user equipment within the wireless communications system 10. The radio network controller 170 is operable to route traffic via circuit-switched and packet-switched networks. Hence, a mobile switching centre 250 is provided with which the radio network controller 170 may communicate. The mobile switching centre 250 then communicates with a circuit-switched network such as a public switched telephone network (PSTN) 210. Likewise, the network controller 170 communicates with service general packet radio service support nodes (SGSNs) 220 and a gateway general packet radio support node (GGSN) 180. The GGSN then communicates with a packet-switch core 190 such as, for example, the Internet. As shown in more detail in FIG. 2, there are provided small cell base stations, in this example femto cell base stations $F_A$ to $F_C$, each of which provides a femto cell A to C in the vicinity of a building within which the associated femto cell base station is installed. The femto cells A to C provide local communications coverage for a user in the vicinity of those buildings. Each femto cell base station $F_A$ to $F_C$ communicates via a femtocell controller/gateway 230. A mobility event such as a handover or camping event occurs between the base station 22 and the femto cell base stations $F_A$ to $F_C$ when the femto base stations $F_A$ to $F_C$ come within range. The femto cell base stations $F_A$ to $F_C$ typically utilise the user's broadband Internet connection 240 (such as ADSL, Cable, Ethernet, etc.) as a backhaul.

Femto cell base stations $F_A$ to $F_C$ are lower-power, low-cost, user-deployed base stations that provide a high cellular quality of service in residential or enterprise environment. In contrast to current macro cell approaches where complex and highly reliable base stations are deployed to strategic locations decided by the network owner, the femto cell base stations $F_A$ to $F_C$ are provided locally by customers. Such femto cell base stations $F_A$ to $F_C$ provide local coverage in areas of the macro network where quality of service may be low. Hence, the femto cell base stations $F_A$ to $F_C$ provide for improved quality of service in areas which are difficult for network operators. Femto base stations may be private access or may be public access. In a femto base station that provides private access, access is registered only to registered users, for example family members or particular groups of employees. In femto base stations which are public access, other users may use the femto base station, typically subject to certain restrictions to protect the quality of service received by preferred users.

To reduce the cost of the femto base stations $F_A$ to $F_C$ and to reduce complexity and interference effects of the femto cell on other user equipment within the macro cell, the transmission power of the femto cell base station $F_A$ to $F_C$ is relatively low in order to restrict the size of the femto cell to a range of tens of meters or less. The femto cell base stations $F_A$ to $F_C$ have extensive auto-configuration and self-optimisation capability to enable a simply plug-and-play deployment. As such, they are designed to automatically integrate themselves into an existing macro cellular wireless network 10.

The femto cells are normally grouped into clusters and each femto cell cluster behaves like a single RNC when communicating with an SGSN in an existing packet switch core network or when communication with a MSC in an existing circuit switched core network. However, given that the RNC functionality is geographically dispersed across a large number of network elements, it is necessary to deploy a femto gateway for each cluster of femto cells. This femto gateway terminates the signalling interfaces between the traditional core network elements and the femto cell cluster, thereby creating the notion of a single virtual RNC. This virtual RNC represents the femto cell cluster as a whole. The femto gateway supports a number of procedures that are implemented on the femto base stations themselves.

Figure 3:
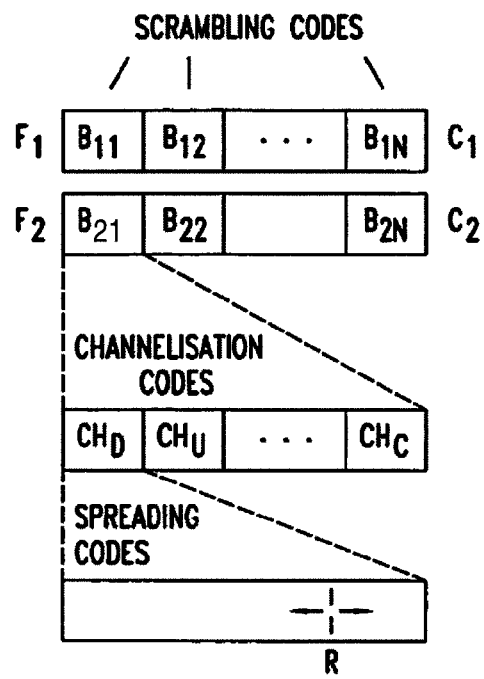
FIG. 3 illustrates an example arrangement showing the composition of transmission carriers and the effect of different types of codes.

FIG. 3 illustrates conceptually an example arrangement showing the composition of transmission carriers and the effect of different types of codes. In this example, there are provided two broadband carriers $C_1$ and $C_2$, each being transmitted on a different frequency $f_1$ and $f_2$. Typically, the number of different carriers available to a network operator is low. Hence, the carriers are split using scrambling codes to enable the carriers to support multiple transmissions. Accordingly a plurality of, typically orthogonal, scrambling codes are provided which provide for a plurality of bearers $B_{11}$ to $B_{1N}$ and $B_{21}$ to $B_{2N}$. To further support multiple transmissions, these bearers are split using channelization codes into a plurality of channels. In the example shown, the bearer $B_{21}$ is split into a plurality of channels, in this example a downlink channel $CH_D$, an uplink channel $CH_U$, a control channel $CH_C$ and a plurality of other channels (not shown).

Each channel utilises a spreading code to enable each channel to be decoded in the presence of interference from other channels. The spreading code is used by a receiver to identify and extract the original data. The effect of the spreading code is to effectively spread the transmitted data over a greater number of bits in order to reduce its susceptibility to interference and to improve the reliability of data extraction. However, a consequence of this is that the greater the length of the spreading code (and therefore the greater the extent of duplication and associated resistance to data loss), the lower the effective data rate of the channel becomes. Hence, a trade-off exists between providing high data rates and providing the certainty of being able to extract the original data reliably. In other words, using a long spreading code increases the reliability of transmission and enables weak signals to be received in the presence of high amounts of interference, but this decreases the effective data rate of the channel. Conversely, a shorter spreading code decreases the amount of duplication within the channel and enables the higher effective data rates to be achieved, but this is at the expense of susceptibility to interference and potential inability to decode weak signals.

Figure 4:
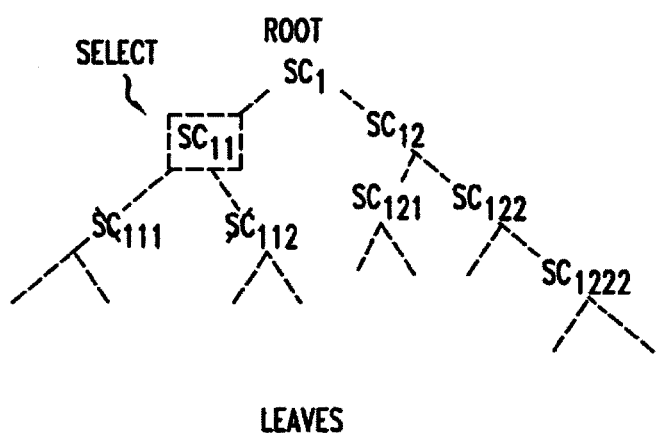
FIG. 4 illustrates schematically an example tree arrangement of orthogonal spreading codes.

FIG. 4 illustrates schematically an example tree arrangement of orthogonal spreading codes. Starting at the root spreading code $SC_1$, the length of the code increases by one every time a branch of the tree is followed in a direction away from the root. That is to say, the length of spreading code $SC_{12}$ is one greater than the length of spreading code $SC_1$ and the length of spreading code $SC_{122}$ is one greater than the length of spreading code $SC_{12}$. Accordingly, it can be seen that towards the leaves of the tree the codes are longest and therefore provide the lowest effective data rates. Similarly, towards the root of the tree the codes are shortest and therefore provide the highest effective data rates.

Orthogonality of the codes can be achieved by ensuring that if a given code in the tree is used, then none of the codes from that scrambling code towards the leaves can then be used. For example, if the spreading code $SC_{11}$ were selected, then all codes towards the leaves (i.e. spreading code $SO_{111}$ and $SO_{112}$ and their leaf spreading codes) would no longer be available. This means that the selection of spreading codes needs to be carefully controlled, since an inappropriate selection of a spreading code can lead to unavailability of other spreading codes. For example, if spreading codes $SC_{11}$ and $SC_{12}$ were selected, then no other spreading codes would be available.

As the number of base stations increase, the likelihood of neighbouring base stations using the same carrier frequency and the same scrambling code also increases. This is likely to particularly be the case for femto base stations which are deployed by private users sometimes in dense areas such as apartment complexes or commercial buildings.

Figure 5:
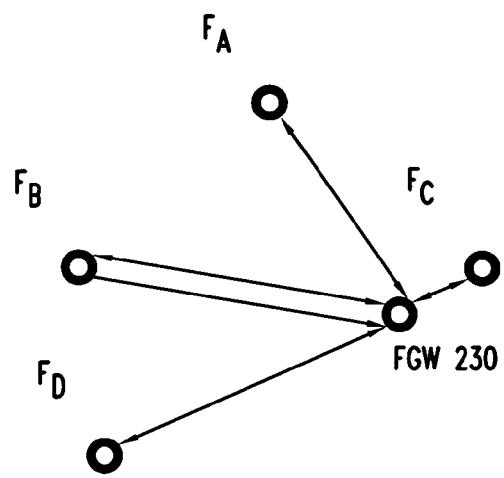
FIG. 5 shows a centralised control scheme.

Turning now to FIG. 5, this shows a centralised control scheme where a central controller, such as a femto gateway 230 or RNC or mobility management entity (MME). manages a number of base stations such as femto base stations $F_A$ to $F_C$.

The gateway 230 maintains a neighbour list indicating each femto base station, their carrier and scrambling codes. From this information the gateway 230 is able to derive sets of neighbouring femto base stations which share the same carriers and scrambling codes.

Figure 6:
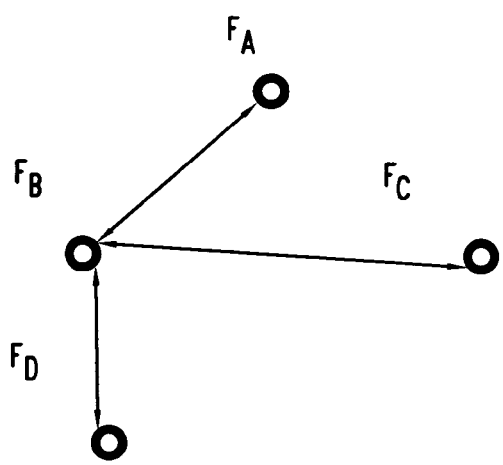
FIG. 6 shows a distributed control scheme.

Turning now to FIG. 6, this shows a distributed control scheme. In this arrangement, rather than having a gateway 230, the femto base stations themselves can act as a central controller and through information either provided from user equipment measurement reports, from sniffing by the femto base station itself and/or from information provided by the core network maintains a neighbour list indicating each femto base station, their carrier and scrambling codes. From this information each femto base station is able to derive a set of neighbouring femto base stations which share the same carriers and scrambling codes.

Although the following examples describe operation in relation to femto base stations, it will be appreciated that the same techniques may be applied to any neighbouring base stations which share carriers and scrambling codes.

As mentioned above, if each base station were permitted to select its own spreading codes in isolation, then non-orthogonal codes may be selected or codes may be selected which prevent other neighbouring base stations from being able to select a non-interfering spreading code. Accordingly, a collaboration or negotiation between neighbouring base stations, each utilising the same scrambling code on the same carrier, is required to prevent unnecessary interference from occurring. In particular, careful allocation of the spreading codes is required to ensure that there are enough spreading codes for each femto cell to operate and that the channels requiring high data rates get as short a spreading code as possible.

Returning now to FIG. 5, in this example the femto base station $F_A$ needing a spreading code sends a request to the gateway 230 who then either directly allocates an available spreading code or starts an allocation algorithm that reallocates the already allocated spreading codes amongst those base stations that currently need spreading codes.

The gateway 230 receives an indication of each base station's operating characteristics such as, for example, an indication of the traffic demand that the base station has to meet and/or any minimum quality of service requirements that a base station may need to meet which may restrict the minimum length of channelization code that may be selected for that base station. Accordingly, the gateway 230 will receive one or more of the following inputs: the number of neighbouring base stations sharing the same carrier and scrambling code, the traffic demand on each of those base stations (this may be either a fixed demand, a variable demand or an indication that there is no demand) and any quality of service requirements. The gateway 230 will also be provided with a tree of spreading codes, such as that illustrated in FIG. 4.

An algorithm may then use that information to achieve any one of a number of different possible desired outcomes, in accordance with specified policies. For example, the algorithm may only consider those base stations which have current traffic demand and seek to allocate the minimum length spreading code to each of those base stations. Alternatively, the algorithm may allocate only spreading code having a minimum length to take into account the quality of service restrictions on a base station. Likewise, the algorithm may pre-allocate spreading codes to base stations with no active traffic demand, in order that those codes may be rapidly utilised when required. By pre-allocating spreading codes, the need to re-execute the allocation algorithm is obviated when traffic demand occurs or when another base station within the set is activated.

Should the spreading codes need to be re-allocated due to a change in the operating characteristics of at least one of the femto base stations that cannot be met with the current allocation of spreading codes, then the gateway 230 may re-request the required information from the base stations, re-run the algorithm and re-allocate the spreading codes to each base station.

In this way, it can be seen that the allocation of spreading codes can occur in a coordinated manner to attempt to meet the needs of all of the base stations within the set. Of course, it will be appreciated that not every need may be fully met, but by using this approach a solution which satisfies the greater need of all the base stations may be achieved.

Returning now to FIG. 6, rather than utilising the gateway 230, the base stations themselves can act as a central controller for a distributed scheme. For example, femto base station $F_B$ requires spreading codes and will start negotiation with its neighbours. Accordingly, in this arrangement the femto base station $F_B$ is provided with the much of the same functionality as the gateway 230 mentioned above. An advantage of such a distributed scheme is that it provides for better scalability.

Should femto base station $F_B$, during the initiation of a negotiation to allocate spreading codes, find that another femto base station $F_A$ has started a negotiation, femto base station $F_B$ may then leave the control of the negotiation to femto base station $F_A$. If the two femto base stations initiate a negotiation simultaneously, they may run a distributed election algorithm to choose which one ought to act as the controller, who then does the work.

Figure 7:
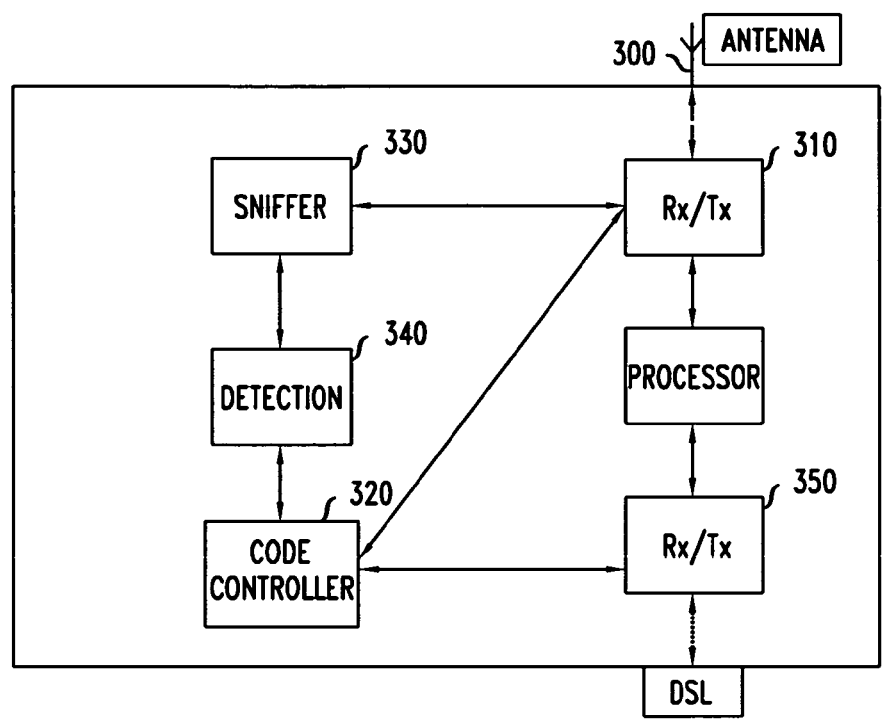
FIG. 7 illustrates an example arrangement of a femto base station.

FIG. 7 illustrates in more detail an example arrangement of a femto base station, generally F, incorporating the spreading code allocation functionality. The femto base station F has an antenna 300 operable to support communications with user equipment and to detect the presence of other base stations. The antenna 300 is coupled with a transceiver 310, which is allocated codes by a code controller 320. The code controller 320 operates a spreading code allocation algorithm using information gathered either via the antenna 300, transceiver 310, sniffer 330 and detection unit 340 route, or via the backhaul transceiver 350.

When setting up connections with user equipment, a suitable spreading code will need to be allocated. The code controller 320 either has a spreading code already available, starts negotiating for one with the femto base stations that are neighbours, or requests one from the gateway 230. The division of the available spreading codes is performed in accordance with a particular predetermined policy. For example, one policy could be to allocate the codes in proportion to traffic demands so that, for example, for neighbouring base stations each requiring a high load channel will each get approximately one quarter of the available spreading codes. Another policy may be to favour the first base station's two requests, so that later requests are given longer spreading codes and thus less data bandwidth. However, it will be appreciated that any desirable policy and implementing algorithm to allocate these spreading codes may be used. Another policy may be to pre-allocate spreading codes for future allocation to base stations that in future require to support transmissions with user equipment. Another policy may be to prevent less than a minimum length spreading code being allocated to ensure that a minimum level of redundancy occurs in the transmissions to improve their robustness to interference. Another policy may be to allocate spreading codes which achieve a minimum data throughput to each base station.

Irrespective of which scheme is used, when a base station receives a new spreading code, it gives these codes to its transmission unit at a predetermined time. It is important for the base stations to implement the change in codes at the correct time, as the actual codes in use need to be orthogonal or else they will cause interference. Preferably, base stations within a macro cell can synchronise their transmissions using the pilot of that macro base station. Alternatively, the base stations can run a time synchronisation protocol such as MTP to synchronise their clocks via their backhaul.

Hence it can be seen that this approach separates the traffic of different base stations using a spreading technique: base stations negotiate a set of orthogonal spreading codes and then use them to avoid interference. Spreading codes can be described as a tree, where the length of the code increases by one every time a branch of the tree is followed in a direction away from the root; we say down to signify this direction and say up to signify direction toward the root. At the leaves of the tree, the codes are longest and provide the lowest data rates. Orthogonality of the codes is achieved as follows: if a given code in the tree is used, none of the codes below it can be used. There is a trade off between the number of usable codes and the maximum data rate achievable on the channels. Thus base stations that require high data rates must have short codes, but there is a limited amount of short codes. To support many base stations, there must be many codes in use—one for each channel. This means that this approach requires careful negotiation of the codes as to ensure that there are enough codes for each base station to operate and that the channels requiring high data rates get as short a code as possible (as to achieve as high a data rate as possible). Spreading codes can be reused by other base stations as long as two base stations that use the same channelization code (or subcode) are not within range of one another.

As mentioned above, a problem that can occur when the density of base stations increases is that the likelihood of neighbouring base stations sharing identical carriers and scrambling codes also increases. This causes a problem for the core network because user equipment may not be able to detect during an active call that a mobility event is occurring. This is because the user equipment will fail to detect a change in cell because the user equipment uses a change in scrambling codes to detect that a change in cell is occurring. However, because neighbouring cells may use identical scrambling codes, the user equipment is unable to identify a change in cell.

Accordingly, a technique is provided where the core network detects that neighbouring base stations share the same carrier and scrambling code and, for those sets of neighbouring base stations, information relating to the strength of the pilot signal that shares the same scrambling code as other neighbouring pilot signals, which may otherwise have been utilised in the assessment of whether a mobility event is occurring, is ignored and not used in the assessment of whether a mobility event is occurring. Instead, the core network uses information relating to any further pilot signals also being transmitted by those base stations, and whose strengths are being reported by the user equipment in order to make that assessment.

Figure 8:
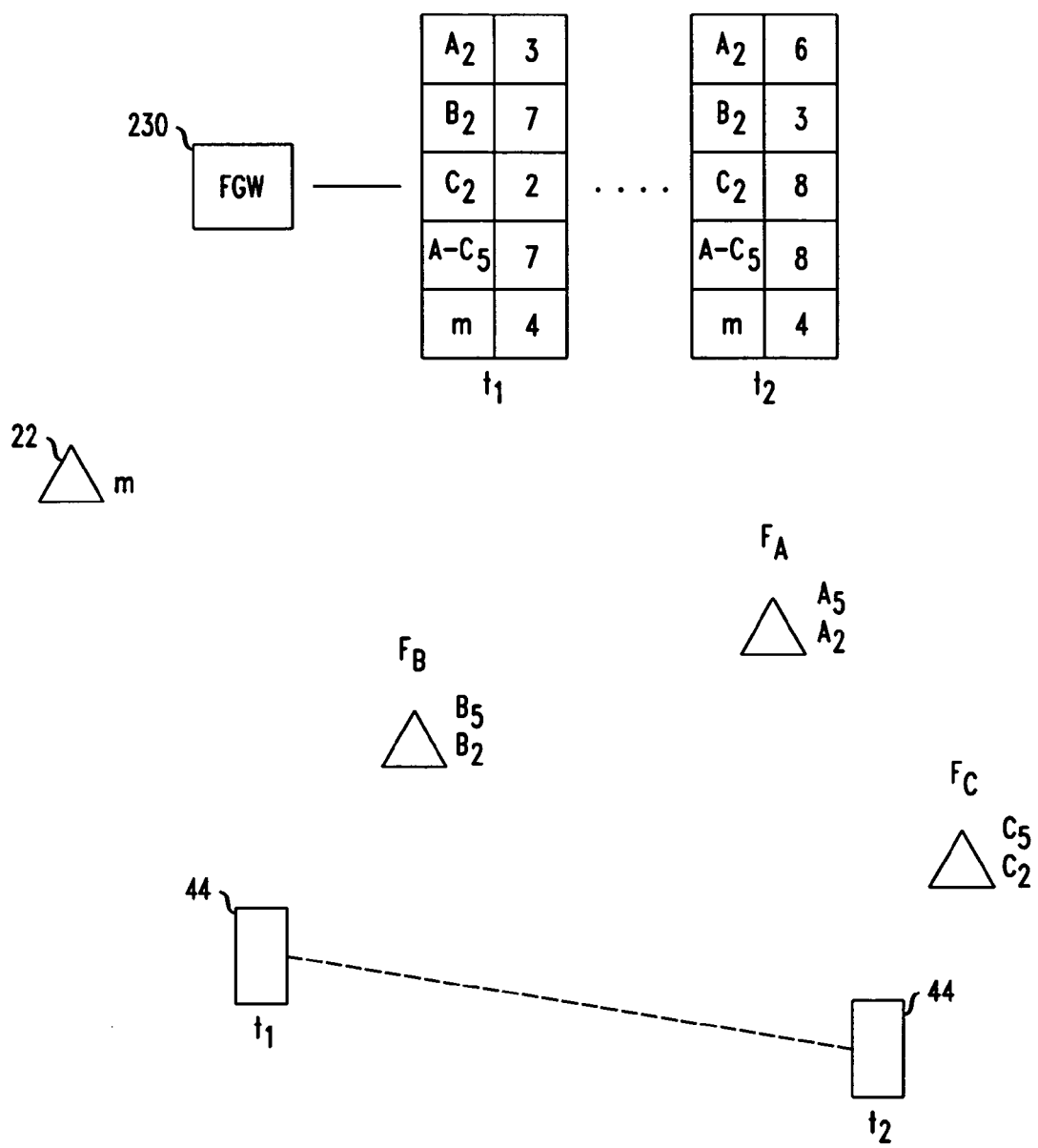
FIG. 8 illustrates an example arrangement of base stations.

FIG. 8 illustrates an example arrangement of base stations. In this arrangement, there is provided three femto base stations $F_A$, $F_B$, $F_C$, each of which provides coverage within the coverage area of a macro base station 22. Each of the femto base stations $F_A$ to $F_C$ utilise dual pilot transmissions.

A network node, such as the gateway 230, interrogates base stations under its control. The gateway 230 determines neighbour lists for each of the femto base stations, as well as determining the carriers and the scrambling code used by each of the pilot transmissions. In this example, it is identified that pilot 1 for each of the femto base stations $F_A$ to $F_C$ shares the same carrier and scrambling codes. Accordingly, the femto gateway will designate any measurement information relating to those pilots, designated as A-Cs. as being information relating to a shared pilot and will ignore that information for the purposes of assessing whether a mobility event has occurred. Instead, the femto gateway 23 will utilise the measurement information relating to pilot 2 of each of the femto base stations $F_A$ to $F_C$, designated as $A_2$ to $C_2$, respectively.

As can be seen in FIG. 8, the user equipment at time $t_1$ is initially located in the vicinity of femto base station $F_B$. The user equipment 44 senses the strength of pilots that it is able to receive and provides this information in measurement reports to the gateway 230. The gateway 230 then assembles the list as shown. As can be seen, the list shows that the strongest signal received by the user equipment is that of the pilot $B_2$ of femto base station $F_B$. The shared pilots A-Cs have the same strength. The next strongest signal is from the pilot M of the macro base station 22, then the second pilot $A_2$ from femto base station $F_A$ and finally the second pilot $C_2$ from femto base station $F_C$. Because the other pilot from femto base stations $F_A$ and $F_C$ share the same carrier and scrambling code as that for femto base station $F_B$, it is not possible to separately measure these signals.

At time $t_2$, the user equipment 44 has moved to a location in the vicinity of femto base station $F_C$. The user equipment 44 continues to provide measurement reports to the femto gateway 23 and the table is updated as indicated. As can be seen, the strength of the signal reported for the shared pilot A-Cs has actually gone up, despite the user equipment 44 having moved away from the femto base station $F_B$. This is due to the proximity of the user equipment 44 to the femto base station $F_C$ which is also transmitting the same pilot signal on the same carrier, with the same scrambling code.

As can be seen from the list incorporating the measurement reports relating to the other pilot signals, the strongest pilot signal is the second pilot signal $C_2$ from femto base station $F_C$, then the second pilot signal $A_2$ from femto base station $F_A$, followed by the second pilot signal from the macro base station 22 and finally the second pilot signal $B_2$ from femto base station $F_B$.

In this example, the signal from the femto base station $F_B$ may now be insufficient to support reliable communication with the user equipment 44. However, because the strength of the shared pilot A-Cs has not dropped, the fact that the user equipment 44 is no longer supportable by the femto base station FB may not have been detected by the network, nor the user equipment 44.

However, the gateway 230 is aware that it should disregard information provided in measurement reports relating to the shared pilot A-Cs. Accordingly, instead, the gateway 230 monitors the signal strength of the secondary pilot $B_2$ provided by the femto base station $F_B$ and notices that the user equipment 44, when transiting between time $t_1$ and $t_2$ reports that the signal strength associated with the pilot $B_2$ begins to drop.

When the strength of this pilot $B_2$ drops to below a predetermined threshold, the gateway 230 will initiate a handover procedure to hand over the user equipment 44. Depending on whether the neighbouring femto base stations are open access or private access and, if private access, whether the user equipment 44 is a registered user of that femto base station, will affect whether the handover procedure will hand over the user equipment 44 to another femto base station or back to the macro base station 22. Assuming that the gateway 230 determines that a femto base station may be used as a candidate for handover, the gateway 230 will refer to the table to identify the candidate with the strongest pilot signal which, in this case at time $t_2$ is femto base station $F_C$.

Accordingly, this technique use a second pilot signal for each involved base station so that they each send out a unique identification signal. User equipment 44 will pick up the secondary pilot from base stations within range and when moving from one base station to another, it will report the signal strengths of both base station's secondary signal (along with the signal strength of the primary—which the user equipment believes to come from the serving base station). As the secondary pilot signal from serving base station gets weaker and the secondary pilot signal from another base station gets stronger, the network can detect the need for a handover of the user equipment from the serving base station to another base station, if the other base station is private access and the user equipment is not allowed to use that base station then the user equipment is handed over to the macro base station 22 instead.

As mentioned above, a problem can occur in that as the density of deployment of base stations increases, the likelihood of neighbouring base stations using the same carrier and scrambling code also increases. Accordingly, if the user equipment 44 is camped on a base station and is in the idle mode, the use of the same scrambling code by a neighbouring base station can cause a problem in that the user equipment 44 may move from one base station to another without detecting this because it continues to receive the same scrambling code. Should an incoming call occur, the user equipment 44 may now miss the paging message sent out by the original base station.

To address this problem, the network detects that neighbouring base stations share the same carrier and scrambling code and, for those sets of neighbouring base stations cause the base stations in those sets to regularly send a request message to all user equipment camped on those base station to get them to re-read the broadcast channel. Causing user equipment 44 to re-read the broadcast channel forces the user equipment to detect whether a change in cell has occurred because the user equipment will also decode the cell identifier, which will have changed if the user equipment has undergone a mobility event.

Figure 9:
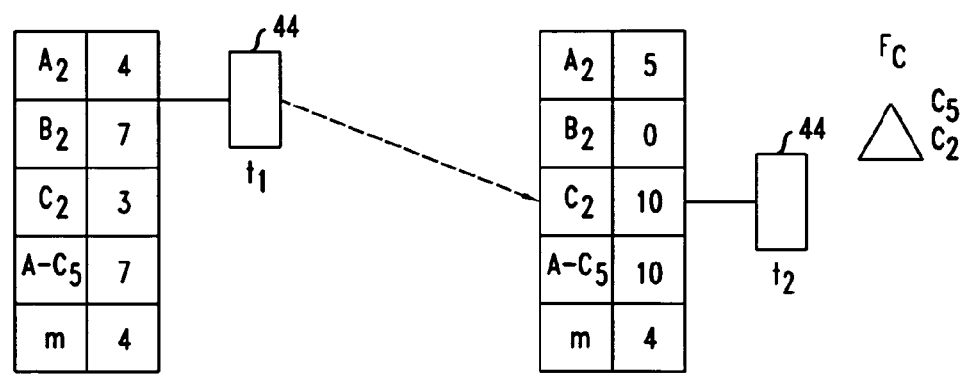
FIG. 9 illustrates an example arrangement of base stations.

FIG. 9 illustrates an example of deployment of femto base stations to illustrate this technique in more detail. As can be seen, there is deployed femto base stations $F_A$ to $F_C$ within the coverage area provided by a macro base station 22. At time $t_1$, the user equipment 44 is in idle mode and is camped on femto base station $F_B$. The gateway 230 has been previously notified that the user equipment 44 is camped on femto base station $F_B$ in accordance with normal procedures.

Should the user equipment 44 remain within the coverage area provided by femto base station $F_B$, then should an incoming call occur the gateway 230 will instruct the femto base station $F_B$ to send a paging message on its paging channel. The user equipment 44, which is within range of the femto base station $F_B$, is alerted by the paging channel to the presence of an incoming call and the call is then connected.

However, a problem occurs when the user equipment transits outside of the coverage area of femto base station $F_B$. AS shown in FIG. 9, at time $t_2$, the user equipment 44 is now outside the coverage area of femto base station $F_B$ and so would fail to receive the paging message alerting it to the presence of an incoming call. The user equipment 44 is unaware that it has moved outside of the coverage area of the femto base station $F_B$ because of the shared scrambling code on the pilot signals from the neighbouring femto base stations $F_A$ and $F_C$. As can be seen from the measurement information being provided by the user equipment at time $t_2$, the user equipment considers that no change in cell has occurred because the strength of the shared pilot signal A-Cs is still indicated as being high. However, this pilot signal A-Cs is now being provided primarily by femto base station $F_C$ instead of femto base station $F_B$.

Accordingly, in the circumstances, the gateway 230 detects that neighbouring femto base stations share a common carrier and scrambling code. Should user equipment 44 camp on any of those femto base stations, then the gateway 230 will instruct the femto base station on which the user equipment 44 is camped to periodically transmit a request to the user equipment 44 to re-read the broadcast channel. To improve the likelihood of user equipment 44 receiving this request whilst it is still able to communicate with the femto base station, the gateway 230 may instruct all neighbouring femto base stations in the set to transmit this request. This request then activates a standard procedure within the user equipment 44 to cause it to re-read the broadcast channel. In so doing, the user equipment 44 will also automatically verify the cell identifier associated with the broadcast channel. Should the user equipment 44 still be within the coverage of the femto base station, then the user equipment 44 will take no further action. However, should the user equipment 44 detect that the cell identifier has changed, then it will initiate system procedures to relocate to the new base station.

Should the gateway 230 receive no indication that the user equipment 44 has initiated a relocation procedure, then this may indicate that the user equipment 44 is still camped on the expected femto base station. In these circumstances, the gateway 230 may extend the time between the periodic request being sent to the user equipment 44 because this may indicate that the user equipment is relatively static and reducing the occurrence of these requests will help to reduce power consumption in the user equipment.

However, should the gateway 230 detect that a relocation has occurred, then this may indicate that the user equipment 44 is currently mobile and so the time interval between sending the request messages to the user equipment 44 may be increased to help improve the probability that a mobility event is detected.

Although the embodiment described above relates to the use of dual pilot base stations, it will be appreciated that this technique is equally applicable to base stations utilising a single pilot.

Accordingly, this technique regularly sends a request message to all user equipment registered at a base station to get them to reread the broadcast channel and thus detect that although a base station is using the same scrambling code, its broadcast data contains a different location code causing the user equipment to reregister. Such a type of request message already exists in the UMTS standards. Preferably, each base station sends a broadcast message (a BCCH read message) at regular intervals causing every registered user equipment to reread all system blocks and updates the user equipment's parameters. User equipment that detects it is in a different cell will then reregister with the new base station. Even user equipment that has wandered far away from the base station where it is registered will get the broadcast message as long as it hears just one of the involved base stations. If it wanders outside the area of the involved base stations, it will hear a different scrambling code (or none at all) and try to reregister as normal for the UMTS protocol. Using a broadcast instead of individual messages reduces signalling because one broadcast can replace a series of individual messages. Furthermore, user equipment that have moved to another cell reregister promptly upon receiving the first broadcast.

It will be appreciated that Interference between base stations is a serious problem for dense deployment of those base station. The techniques mentioned above allow many base stations to be deployed close to each other without serious interference or mobility event detection problems. This will further allow the deployment of base stations by non-technical users that are not aware of other deployed base stations.

Unlike a frequency division solution which is prohibitively expensive as it requires expensive licensed spectrum, or a reducing power solution which reduces the range of the base stations perhaps so much that they no longer provide the coverage require, these techniques provides coverage— perhaps at the cost of lower bandwidth—but coverage with low bandwidth is substantially better than no coverage and allows the dense deployment of base stations by unknowledgeable users.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of controlling transmissions from neighbouring base stations in a wireless telecommunications system, said method comprising:
   determining a plurality of neighbouring base stations use a predetermined carrier and a predetermined scrambling code to support transmissions from each neighbouring base station at a ground-based network node, wherein each neighbouring base station forms a cell defining a radio coverage area for the corresponding neighbouring base station, wherein each neighbouring base station is located within its corresponding cell; and
   allocating spreading codes to the plurality of neighbouring base stations at the ground-based network node such that different spreading codes are allocated to at least neighbouring base stations that are within range of each other to support transmissions from the plurality of neighbouring base stations over a plurality of channels within a predetermined bearer formed by the predetermined scrambling code, wherein the plurality of neighbouring base stations use the same predetermined carrier, the same predetermined scrambling code, and different spreading codes for at least neighbouring base stations of the plurality of neighbouring base stations that are within range of each other to control interference at user equipment served by the plurality of neighbouring base stations.

2. The method of claim 1, wherein said allocating comprises:
   allocating different spreading codes based on operating characteristics of the neighbouring base stations in said plurality of neighbouring base stations.

3. The method of claim 1, wherein said allocating comprises:
   allocating spreading codes based on a traffic demand of the neighbouring base stations within said plurality of neighbouring base stations.

4. The method of claim 1, wherein said allocating comprises:
   allocating spreading codes based on a minimum expected traffic demand of the neighbouring base stations within said plurality of neighbouring base stations.

5. The method of claim 1, wherein said allocating comprises:
   restricting allocation of spreading codes based on a minimum quality of service required for transmissions with the neighbouring base stations within said plurality of neighbouring base stations.

6. The method of claim 1, wherein said allocating comprises:
   allocating spreading codes based on a size of said plurality of neighbouring base stations.

7. The method of claim 1, wherein said allocating comprises:
   allocating spreading codes based on a spreading code reservation requirement for expected future spreading code allocation.

8. The method of claim 2, wherein said allocating comprises:
   reselecting spreading codes based on a change in said operating characteristics.

9. The method of claim 1, wherein said spreading codes are orthogonal spreading codes.

10. The method of claim 9, wherein said orthogonal spreading codes comprise a hierarchical tree of orthogonal spreading codes, different levels of said hierarchical tree of orthogonal spreading codes providing orthogonal spreading codes of different lengths and each level of said hierarchical tree of orthogonal spreading codes providing a number of orthogonal spreading codes having identical lengths.

11. A ground-based network node for a wireless telecommunications system, comprising:
   at least one processor configured to determine a plurality of neighbouring base stations in the wireless telecommunications system use a predetermined carrier and a predetermined scrambling code to support transmissions from each neighbouring base station, wherein each neighbouring base station forms a cell defining a radio coverage area for the corresponding neighbouring base station, wherein each neighbouring base station is located within its corresponding cell;

wherein the at least one processor is configured to allocate spreading codes to the plurality of neighbouring base stations such that different spreading codes are allocated to at least neighbouring base stations that are within range of each other to support transmissions from the plurality of neighbouring base stations over a plurality of channels within a predetermined bearer formed by the predetermined scrambling code, wherein the plurality of neighbouring base stations use the same predetermined carrier, the same predetermined scrambling code, and different spreading codes for at least neighbouring base stations of the plurality of neighbouring base stations that are within range of each other to control interference at user equipment served by the plurality of neighbouring base stations.

12. The method of claim 4, wherein the allocating comprises
allocating a group of spreading codes that optimise achievement of the minimum expected traffic demand.

13. The method of claim 6, wherein the allocating comprises
allocating a group of spreading codes that optimise achievement of the minimum quality of service.

14. The method of claim 6, wherein the allocating comprises
allocating a different spreading code to each neighbouring base station in the plurality of neighbouring base stations.

15. The method of claim 6 wherein the allocating comprises
allocating spreading codes for at least the number of neighbouring base stations in the plurality of neighbouring base stations.

16. A non-transitory computer-readable medium storing program instructions that, when executed by a computer, cause a computer-controlled network node to perform a method of controlling transmissions by a base station, the method comprising:
determining a plurality of neighbouring base stations use a predetermined carrier and a predetermined scrambling code to support transmissions from each neighbouring base station at a ground-based network node, wherein each neighbouring base station forms a cell defining a radio coverage area for the corresponding neighbouring base station, wherein each neighbouring base station is located within its corresponding cell; and allocating spreading codes to the plurality of neighbouring base stations at the ground-based network node such that different spreading codes are allocated to at least neighbouring base stations that are within range of each other to support transmissions from the plurality of neighbouring base stations over a plurality of channels within a predetermined bearer formed by the predetermined scrambling code, wherein the plurality of neighbouring base stations use the same predetermined carrier, the same predetermined scrambling code, and different spreading codes for at least neighbouring base stations of the plurality of neighbouring base stations that are within range of each other to control interference at user equipment served by the plurality of neighbouring base stations.

17. The network node of claim 11, wherein the at least one processor is configured to allocate different spreading codes based on operating characteristics of the neighbouring base stations in the plurality of neighbouring base stations.

18. The network node of claim 11, wherein the at least one processor is configured to allocate spreading codes based on a traffic demand of the neighbouring base stations within the plurality of neighbouring base stations.

19. The network node of claim 11, wherein the at least one processor is configured to allocate spreading codes based on a minimum expected traffic demand of the neighbouring base stations within the plurality of neighbouring base stations.

20. The network node of claim 11, wherein the at least one processor is configured to restrict allocation of spreading codes based on a minimum quality of service required for transmissions with the neighbouring base stations within the plurality of neighbouring base stations.

21. The network node of claim 11, wherein the at least one processor is configured to allocate spreading codes based on a size of the plurality of neighbouring base stations.

* * * * *